United States Patent [19]
Ohmi et al.

[11] Patent Number: 6,116,092
[45] Date of Patent: *Sep. 12, 2000

[54] FLUID PRESSURE DETECTOR USING A DIAPHRAGM

[75] Inventors: Tadahiro Ohmi, Miyagi-ken; Ryosuke Dohi, Osaka; Koji Nishino, Osaka; Nobukazu Ikeda, Osaka, all of Japan

[73] Assignee: Fujikin Incorporated, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/919,110

[22] Filed: Aug. 28, 1997

[30]  Foreign Application Priority Data

Sep. 10, 1996  [JP]  Japan ..................................... 8-238706

[51] Int. Cl.[7] ................................. G01L 7/08; G01L 9/04
[52] U.S. Cl. .................................. 73/715; 73/720; 73/726
[58] Field of Search ........................... 73/715, 720, 726; 148/286

[56]  References Cited

U.S. PATENT DOCUMENTS

| | | | |
|---|---|---|---|
| 5,230,248 | 7/1993 | Cucci et al. ............................ | 73/715 |
| 5,243,222 | 9/1993 | Harper et al. .......................... | 257/774 |
| 5,569,334 | 10/1996 | Kawata et al. ......................... | 148/286 |
| 5,746,841 | 5/1998 | Koike et al. ........................... | 148/286 |

*Primary Examiner*—Harshad Patel
*Attorney, Agent, or Firm*—Griffin & Szipl, P.C.

[57]  ABSTRACT

A good quality passive-state film is formed on a gas-contact face of a diaphragm of a pressure detector using a sensor chip to prevent corrosion on, or water content emission from, or catalytic action at a gas-contact face, thereby improving production quality in a semiconductor manufacturing process and providing high accuracy pressure detection. The passive-state film is formed on the gas-contact face of the diaphragm when the diaphragm is mounted on a diaphragm base. The diaphragm base is then fixedly secured to a sensor base in which a sensor chip is housed and a pressure transmitting medium is sealed in a gap between the sensor base and the diaphragm base.

4 Claims, 4 Drawing Sheets

FLUID PRESSURE DETECTOR USING A DIAPHRAGM

BACKGROUND OF THE INVENTION

Field of the Invention

The present invention relates to pressure detectors of a type utilizing a sensor chip as a sensor element or a strain gauge; such pressure detectors being mainly used to detect pressures of highly corrosive gas lines, and the like, in semiconductor manufacturing processes.

Heretofore, pressure detectors using sensor chips (as pressure-sensor elements) or strain gauges have been widely utilized to detect fluid pressures inside pipe lines, and the like.

FIG. 7 shows an example of such a pressure detector A, which includes a stainless-steel (SUS 316L) sensor base 1, a sensor chip (a pressure sensor or a semiconductor strain gauge) 2, a diaphragm (SUS 316L) 3, silicone oil 5, a ball 6, a lead pin 7, and the like.

In the pressure detector A in FIG. 7, an outer peripheral edge of the diaphragm 3 (formed of stainless-steel (SUS 316L), having a thickness of about 50 µm, has been welded to a lower end face of the sensor base 1 by means of laser welding, and, when a fluid pressure B applied to a gas-contact face 3a of the diaphragm 3 is transmitted through the silicon oil 5 to the sensor chip 2, values of four strain resistors formed on the sensor chip 2 are changed to cause a signal proportional to the received pressure B. This signal is output at an output terminal of a bridge circuit composed of the four strain resistors.

Further, reference number 16 designates a weld of the diaphragm; and reference number 10 designates a weld of the ball 6.

The above-mentioned pressure detector of FIG. 7 can detect fluid pressure inside a pipe line with a high accuracy and a relatively high sensitivity, thus having excellent and practical usefulness.

However, many problems which must be solved have remained in this pressure detector, the most important of which is corrosion, such as catalytic activity, or the like, on the gas-contact face 3a of the diaphragm 3.

That is, in the pressure detector of FIG. 7, the diaphragm 3 is formed of a stainless-steel (SUS 316L), and a mixed oxide layer of Fe and Cr, having a thickness of about 30 Å, is formed on an electropolished outer face layer of the gas-contact face 3a.

However, for a highly corrosive gas such as a halogen based gas including hydrogen chloride (HCl) and hydrogen bromide (HBr) and a fluorine based gas including fluorine gas ($F_2$) and hydrogen fluoride (HF), which are used for semiconductor manufacturing processes, corrosion significantly progresses due to water, and the like, contained in the gas itself, thereby causing a, so-called, metallic contamination.

Further, in a pipe line for semiconductor manufacturing, an outgas from the contact face 3a and catalytic activation as well as the corrosiveness of the gas-contact face 3a of the above-mentioned diaphragm are also serious problems, so that the gas-contact face 3a is required to be free of gasout, non-catalytic, and non-corrosive.

However, the mixed oxide layer of Fe and Cr formed on the outer face layer of the gas-contact face 3a of the above-mentioned diaphragm 3 is not sufficiently effective to prevent the outgas, causing a large amount of outgas to be released; and, in addition, due to its catalytic action, a self-decomposition of special gases for semiconductor manufacturing is accelerated, whereby various problems arise such as deteriorated product quality.

For this reason, where a pressure detector having a construction as shown in FIG. 7 is used to detect pressure in a pipe line handling a highly corrosive gas, such as the above-mentioned halogen based and fluorine based gases, it is required that the diaphragm 3 have on its gas-contact face 3a a so-called chrome oxide passive-state film ($Cr_2O_3$, for halogen based gases) composed of only Cr, not containing Fe, having a thickness of hundreds of Å, or a fluoride passive-state film ($CrF_3$, $CrF_2$, $FeF_2$, $FeF_3$, and the like, for fluorine based gases), or a mixed-oxide passive-state film ($Al_2O_3/Cr_2O_3$ for ozone gas) composed of mainly aluminum oxide and chrome oxide, thereby protecting the gas-contact face 3a.

This is because: the above-mentioned chrome oxide passive-state film is excellent in corrosion resistance to a halogen-based, highly corrosive, gas, in prevention of outgas, and in non-catalyst properties; the fluoride passive-state film has a high corrosion resistance to a fluorine based, highly corrosive gas and ozone and is excellent in prevention of outgas, and in non-catalyst properties; and further, the mixed-oxide passive-state film composed of mainly aluminum oxide and chrome oxide is excellent in corrosion resistance to an ozone gas having a very strong oxidizing ability.

In order to form the above-mentioned passive-state film composed of 100% chrome oxide, for the diaphragm 3 made of austinitic stainless steel (for example, SUS 316L), it is necessary: (1) to polish the diaphragm 3 using a lapping-polishing method, or the like, so as to allow the outer face to have a microcrystalline structure (a so-called veilubi layer); and (2) heat treat (at 400° C. to 500° C. for one to ten hours) the diaphragm 3 with oxidizing species containing a very small amount of water in a highly reducing atmosphere.

In the same manner, in order to form the fluoride passive-state film, it is necessary: (1) to perform a treatment for forming the passive-state film at 200° C. to 250° C. for one to ten hours in a fluorine gas atmosphere; and (2) to perform a treatment for annealing the passive-state film at 350° C. to 400° C. for one to ten hours.

To form the mixed-oxide passive-state film composed of aluminum oxide and chrome oxide, it is necessary to heat treat (at 400° C. to 600° C. for one to ten hours) the diaphragm 3 of stainless steel containing about 4% of aluminum with oxidizing species containing a very small amount of water in a highly reducing atmosphere.

However, because a sensor chip (a pressure sensor) has a heat resisting temperature of about 150° C. for the conventional pressure detector shown in FIG. 7, the pressure detector cannot be heat treated at these otherwise desirable, high temperatures.

Further, the sensor base 1 and the diaphragm 3 have already been welded in the conventional pressure detector, so that it is difficult to uniformly polish the gas-contact face 3a of the diaphragm 3 at a surface smoothness that a maximum projection value is about 0.7 µm or less, and thus the degree of polishing of the gas-contact face 3a of the diaphragm 3 is hardly uniform.

Still further, for the conventional pressure detector, the weld 16 is positioned on the gas-contact face 3a of the diaphragm 3, so that polishing of the weld 16 brings about a state different from that of non-welded portions, and thus a uniform polished-finish of the weld 16 becomes difficult to achieve.

As a result, for the conventional pressure detector, it is difficult to form the passive-state film, composed of 100% chrome oxide, or the fluoride passive-state film on the gas-contact face 3a of the diaphragm 3, so that as a degree of integration of semiconductors increases, various problems arise such as generation of metallic particles caused by corrosion of the gas-contact face 3a of the pressure detector and/or water content release from the diaphragm face; or troubles caused by catalytic action of the diaphragm face, and thus an improvement of product quality becomes difficult to achieve.

Problems Solved by the Invention

It is an object of this invention to solve the problems described above for conventional pressure detectors; that is, because passive-state films cannot be formed on gas-contact faces of diaphragms of pressure detectors, it is impossible to prevent corrosion of the gas-contact faces of the diaphragms, catalytic action of the diaphragm faces, and water content release from the diaphragm faces. It is a further object of this invention to provide a pressure detector which will not compromise product quality, even when it is used in a semiconductor manufacturing process, in that it provides a diaphragm of a pressure detector with a chrome oxide passive-state film, or a fluoride passive-state film, or a mixed-oxide passive-state film composed mainly of aluminum oxide and chrome oxide on its gas-contact face.

SUMMARY OF THE INVENTION

According to principles of a first embodiment of this invention: a passive-state film 3b is formed on a gas-contact face 3a of a diaphragm 3 provided on a diaphragm base 4; the diaphragm base 4 and a sensor base 1 in which a sensor chip 2 is housed and fixedly secured are combined with, and fixed to, each other; and a pressure transmitting medium 5 is sealed in a space between the sensor base 1 and the diaphragm base 4.

In a second embodiment of the invention: a passive-state film 3b is formed on a gas-contact face 3a of a diaphragm 3 provided on a diaphragm base 4; the diaphragm base 4 and a sensor base 1 are combined with and fixed to each other; and a strain gauge member 16a is fixedly secured to an inside upper face of the diaphragm 3.

In a third embodiment of the invention: a diaphragm 3, formed in a dish shape, and a diaphragm base 4 are combined with and welded to each other by a weld at their side wall faces; a passive-state film 3b is formed on a gas-contact face 3a of the diaphragm 3; the diaphragm base 4, whose diaphragm gas-contact face 3a has the passive-state film 3b thereon, and the sensor base 1, in which a sensor chip 2 is housed and fixedly secured, are combined with and welded to each other by a weld 8 at their side wall faces; and a pressure transmitting medium 5 is sealed in a space between the sensor base 1 and the diaphragm base 4.

A basic construction of a fourth embodiment of the invention is that: a diaphragm 3, formed in a dish shape, and a diaphragm base 4 are combined with, and welded to, each other by a weld 9 at their side wall faces; a passive-state film 3b is formed on a gas-contact face 3a of the diaphragm 3; the diaphragm base 4, whose diaphragm gas-contact face 3a has the passive-state film 3b thereon, and the sensor base 1 are combined with, and welded to, each other by a weld 8 at their side wall faces; and a strain gauge member 16a is fixedly secured to an inside and upper face of the diaphragm 3.

In embellishments of each of the first through fourth embodiments of the invention, the passive-state film 3b is formed as a chrome-oxide passive-state film, a fluoride passive-state film, or a mixed-oxide passive-state film mainly composed of aluminum oxide and chrome oxide. In further embellishments of each of the first and third embodiments of the invention, the diaphragm 3 is formed as a stainless-steel diaphragm having a thickness of about 50 $\mu$m. In still further embellishments of each of the second and fourth embodiments of the invention, the diaphragm 3 is formed as a stainless-steel diaphragm having a thickness of about 200 $\mu$m.

In embellishments of each of the third and fourth embodiments of the invention, outer peripheral edge portions of the diaphragm 3 and the diaphragm base 4 are brazed together so as to be fixedly secured to each other.

In a pressure detector of the present invention, a desired passive-state film has already formed, in advance, on the gas-contact face of the diaphragm when the diaphragm base (having the diaphragm whose gas-contact face has the passive-state film thereon) is combined with, and fixed to, the sensor base in which the sensor chip is housed and fixed; so that even where the diaphragm base and the sensor base are welded and fixed at their side wall faces, the desired passive-state film can be formed on the gas-contact face of the diaphragm without adversely affecting, by heating, the sensor chip or the strain gauge member of the strain gauge.

As a result, a corrosion of the gas-contact face, water content release from the diaphragm face, and catalytic action of the gas-contact face are prevented, thereby allowing product quality in a semiconductor manufacturing process to be significantly improved.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 7:
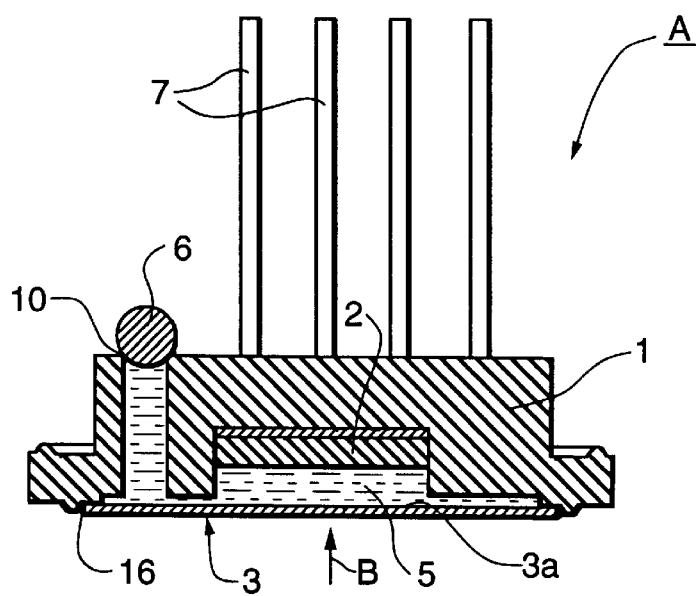
FIG. 7 is a vertical sectional view of a prior-art pressure detector utilizing a conventional sensor chip.

With reference to the drawings, embodiments of the invention will be explained hereinafter. In drawings 1 through 6, corresponding members (members having similar functions) as those shown in the above mentioned prior-art device of FIG. 7 are designated by the same, or similar, reference numbers, although in some cases the members are somewhat different in structure.

Figure 1:
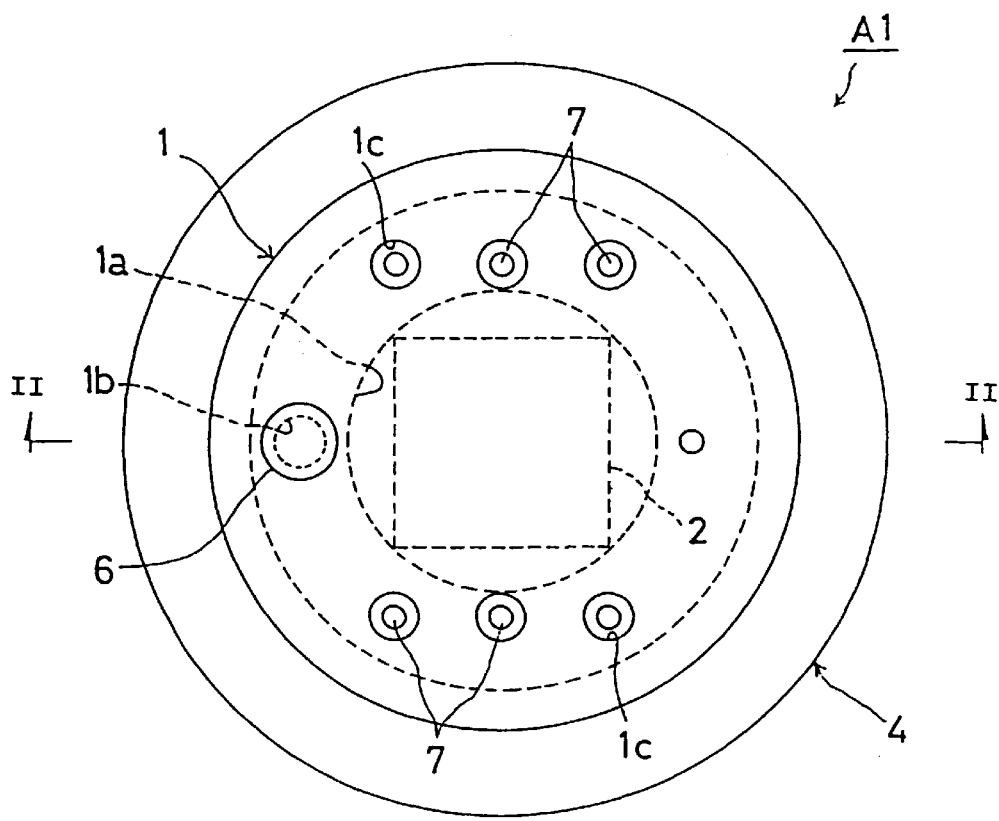
FIG. 1 is a plan view of a pressure detector of a first embodiment of this invention.
Figure 2:
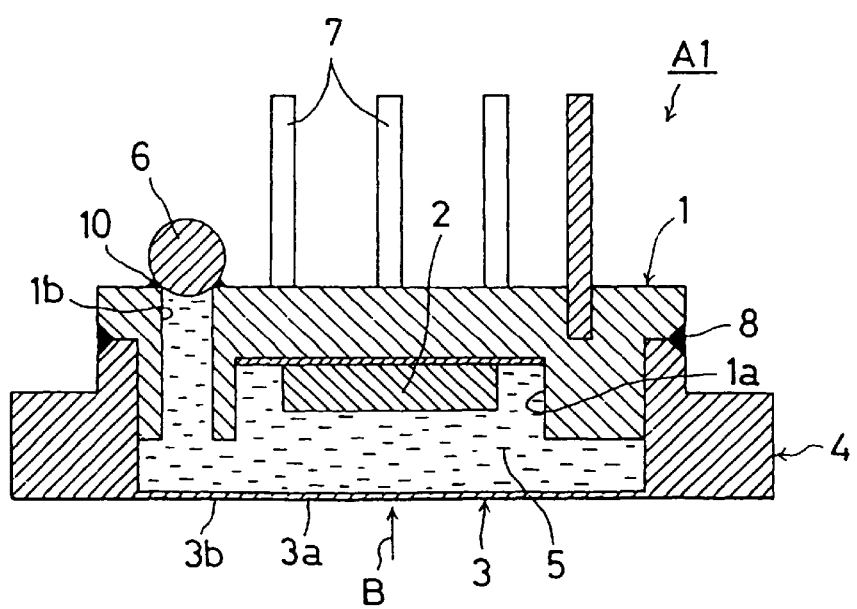
FIG. 2 is a sectional view taken on line II—II in the arrow direction in FIG. 1.

FIG. 1 is a plan view of a pressure detector A1 of a first embodiment of the present invention; and FIG. 2 is a vertical sectional view thereof. In the figures: reference number 1 designates a sensor base; reference number 2, a sensor chip (a pressure-sensor); reference number 3, a diaphragm; reference number 4, a diaphragm base; reference number 5, silicon oil forming a pressure transmitting medium; reference number 6, a ball of a sealing member; reference number 7, lead pins; and reference number 8, a portion where the sensor base and the diaphragm base are welded together.

The sensor base 1 of FIG. 1 is made of stainless steel, has a chip storage section 1a at a center of a lower face thereof and defines an oil injection hole 1b, a lead pin inserting hole 1c, and the like. A known diffusion type semiconductor pressure transducer is used as the above-mentioned sensor chip (the pressure sensor) 2, wherein a piezoresistance value of the semiconductor changes when subjected to a pressure.

That is, the sensor chip 2 has a diaphragm structure and deforms when subjected to the pressure, four resistances being formed thereon by a manufacturing method like that of integrated circuits (IC), so that, when the resistance values of the four resistances, which are connected in a bridge, are changed by the application of the pressure, a voltage signal proportional to the pressure is output to output terminals of the bridge.

Although, in this embodiment, a diffusion type semiconductor pressure transducer is used as the sensor chip 2, it should be pointed out that a pressure detecting sensor chip 2 having another structure may be used instead.

The above-mentioned diaphragm 3 is formed integrally as one piece of material with the diaphragm base 4, and is made of stainless steel, with a thickness of about 50 $\mu$m and an inside diameter of about 10 mm$\phi$.

The thickness of the diaphragm 3 can be changed according to a range of pressures to be detected by the pressure detector, but a pressure detector of this embodiment for measuring absolute pressures from several torrs to 11 kgf/cm$^2$, it is desirable to make the diaphragm 3 with the diameter of 10 mm$\phi$ and being about 50 $\mu$m thick.

On a gas-contact face 3a of the diaphragm 3 is formed a so-called passive-state film by a known method; and that is, as the outer face layer of the gas-contact face 3a is formed a passive-state film 3b composed of about 100% chrome oxide and having a thickness about 200 Å, or a fluoride passive-state film 3b having a thickness about 1000 through 3000 Å, or a mixed-oxide passive-state film mainly composed of aluminum oxide and chrome oxide and having a thickness of about 200 Å.

That is, for forming the chrome oxide passive-state film 3b, first the gas-contact face 3a of the diaphragm is lapping polished to allow the outer face to be of a microcrystalline structure, thereby facilitating transfer of Cr from an inner layer part. Thereafter, the gas-contact face 3a of the diaphragm is heat treated at a temperature 400° to 500° for several hours in a mixture of H$_2$ of about 3% and Ar, with H$_2$O of about 100 ppm.

Thus, the passive-state film 3b composed of about 100% chrome oxide and having a thickness of about 200 Å is formed.

Where the stainless steel which forms the diaphragm 3 is a ferritic stainless steel having a high content of Cr, the above-mentioned polishing treatment may be omitted in some cases. This is because in ferritic stainless steels, a transfer of Cr from an inner layer part takes place relatively easily.

For forming a fluoride passive-state film 3b on the gas-contact face 3a of the diaphragm, first the gas-contact face 3a is heat treated at a temperature 200° to 250° C. for several hours in a diluted fluorine gas atmosphere to form the fluoride passive-state film. Then, the above-mentioned fluoride passive-state film is annealed at a temperature 350° to 400° C. for several hours to stabilize the fluoride passive-state film.

The above-mentioned silicone oil 5 of the pressure transmitting medium transmits pressure applied to the diaphragm 3 to the sensor chip 2. A silicone oil which has a low temperature expansion coefficient and a low compression coefficient, and is chemically stable, is normally used. Of course, different pressure transmitting mediums can be used.

The above-mentioned ball 6 is used as a sealing member to seal the silicone oil 5 in the oil injection hole 1b, and a bearing steel ball is used for this purpose.

Figure 6:
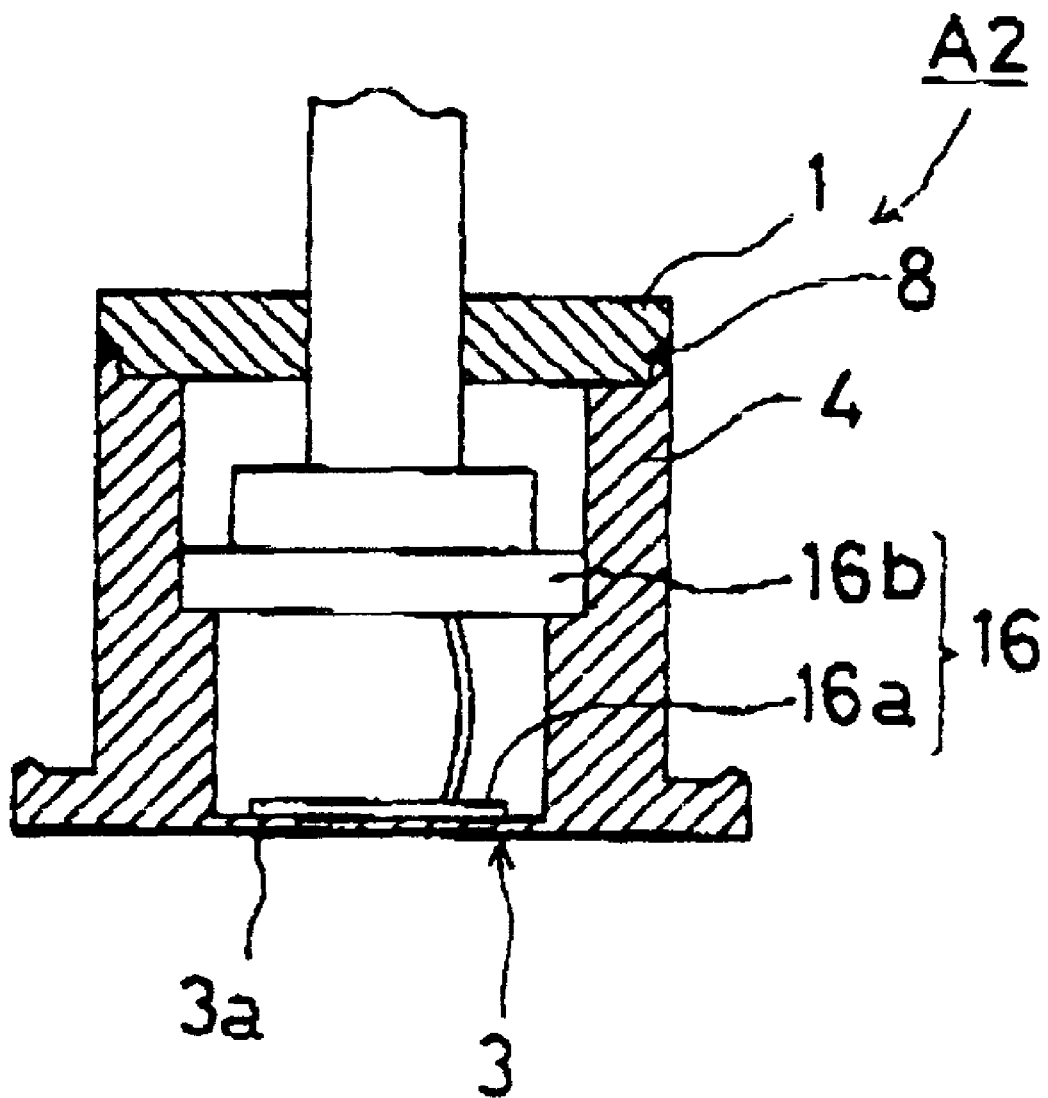
FIG. 6 is a schematic vertical sectional view of a pressure detector of a second embodiment of the present invention.

FIG. 6 shows a second-embodiment pressure detector A2 using a so-called metallic strain gauge 16 in place of the sensor chip (the pressure sensor or semiconductor strain gauge) 2.

That is, to an inside upper face of the diaphragm 3, which has a thickness about 200 $\mu$m, is secured a strain gauge member 16a which is made by covering a metallic fine wire, or a metallic-foil resistance wire, with an insulator and forming this in a shape of a film. Mounted to an inside of the sensor base 1 is a bridge circuit (a transducer) 16b for detecting a change in resistance.

In the second-embodiment pressure detector of FIG. 6, an inner space of the diaphragm base 4 is not filled with silicone oil or the like.

Although in the second-embodiment pressure detector of FIG. 6 a metallic strain gage 16 is used in which the strain gage member 16a is separated from the transducer 16b, a strain gauge having a structure which integrates the two into one-piece may also be fixedly secured to the inside, upper face of the diaphragm 3.

A manner in which the pressure detector of the first embodiment shown in FIGS. 1 and 2 is assembled will be explained hereinafter.

First the diaphragm 3 is formed integrally as one piece of material, with the diaphragm base 4, and, thereafter, a chrome-oxide passive-state film, or a fluoride passive-state film, or a mixed-oxide passive-state film composed mainly of aluminum oxide and chrome oxide is formed on the gas-contact face 3a of the diaphragm 3.

The sensor base 1 is formed, and the sensor chip 2 is inserted thereinto and fixedly secured within the chip inserting hole 1a.

Then, the diaphragm base 4, whose diaphragm gas-contact face 3a is covered with the passive-state film 3b, and the sensor base 1 are placed opposite each other, as shown in FIG. 2, and the full circumferences of their side wall faces are welded at the weld portion 8 by a TIG welding method.

When the above-mentioned welding 8 is completed, the oil injection hole 1b is used to fill the chip storage section 1a with the pressure transmitting medium (the silicone oil) 5, and thereafter the sealing member (the ball) 6 is welded at 10 to the sensor base 1 to seal in the oil 5.

In the pressure detector A1 of this first embodiment, the weld 8 is not on the gas-contact face 3a of the diaphragm 3, so that the gas-contact face 3a can be very uniformly polished, with the result that the oxide passive-state film of 100% chrome can be formed.

The diaphragm 3 and the diaphragm base 4 are integrally formed of one piece of material so that there is only one weld portion 8, thereby facilitating assembly of the pressure detector A1 greatly.

Figure 3:
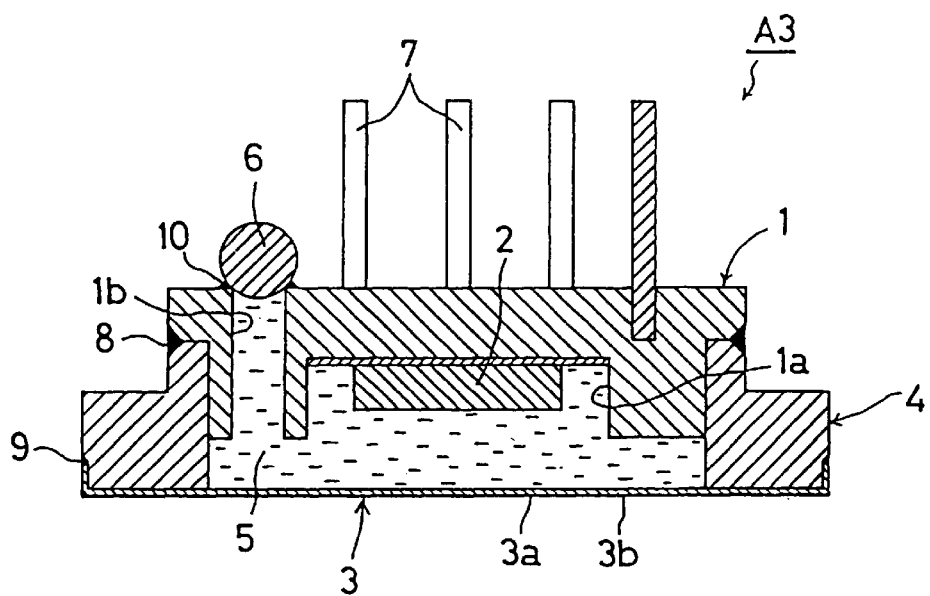
FIG. 3 is a vertical sectional view similar to that of FIG. 2 of a pressure detector of a third embodiment of the invention.

FIG. 3 is a vertical sectional view of the pressure detector A3 of a third embodiment of the present invention. The third embodiment is different from the first embodiment in that the diaphragm 3 and the diaphragm base 4 are separate bodies.

That is, the diaphragm 3 is made, in a shape of a dish, of stainless steel (SUS 316L) having a thickness about 50 μm. When the pressure detector is assembled, first the diaphragm base 4 and the diaphragm 3 are combined as shown in FIG. 3, and thereafter opposing faces of these two members are welded at the weld portion 9, by a laser welding method, at the side of the diaphragm base 11.

Then, the passive-state film 3b is formed on the gas-contact face 3a of the diaphragm 3 welded to the diaphragm base 4.

The other following assembling steps are similar to those of the first embodiment.

In the above-described third embodiment A3, the diaphragm 3 is first welded to the diaphragm base 4, and then the passive-state film 3b is formed on the gas-contact face 3a of the diaphragm 3. Of course passive-state film 3b could first be formed on the gas-contact face 3a of the diaphragm 3, and then the diaphragm 3 could be welded to the diaphragm base 4.

The third embodiment is constructed such that the diaphragm 3 is formed as a separated member. Consequently, the diaphragm is easily formed, though there is the disadvantage that two welds must be made.

Figure 4:
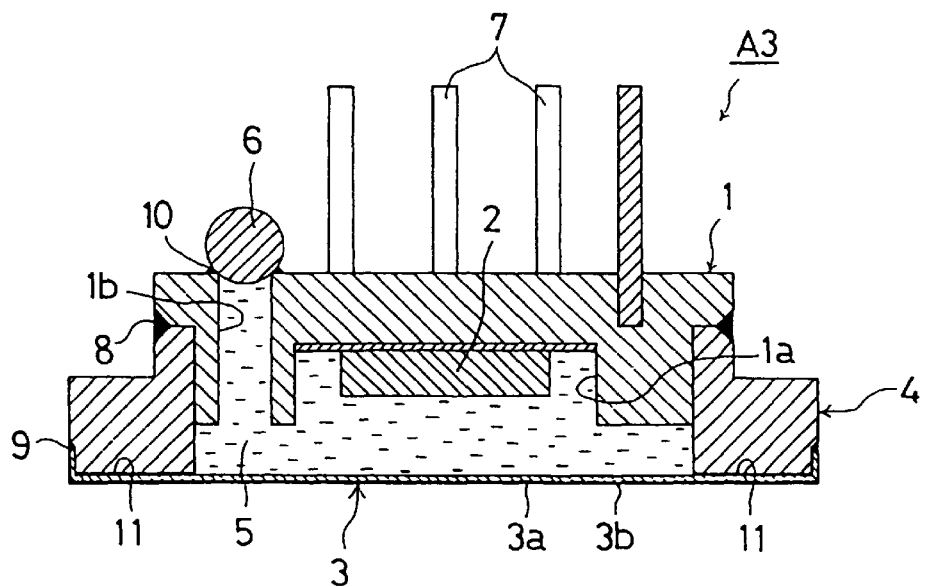
FIG. 4 is a vertical sectional view similar to those of FIGS. 2 and 3, of a pressure detector of an enhanced third embodiment of the invention.

FIG. 4 is a vertical, sectional view of a pressure detector of a modified third embodiment A3' of the present invention, which is different in construction from the above-mentioned third embodiment A3 only in that a brazing material 11 is interposed between an outer peripheral edge of the diaphragm 3 and a corresponding face of the diaphragm base 4 so that these two members are fixedly secured to each other by brazing. The modified third embodiment A3' is the same construction as the third embodiment A3 in other respects.

In the above-mentioned third embodiment A3 of FIG. 3, silicone oil 5 may enter a gap between the diaphragm base 4 and the diaphragm 3. As a result, a change in the amount of the oil 5 which enters the gap causes an initial calibration value of the pressure detector to vary and thus various inconveniences to occur.

Hence, in the modified third embodiment A3', when combining the diaphragm 3 and the diaphragm base 4, the brazing material 11 is first interposed between these two members and then heated to melt so that the outer peripheral edge of the diaphragm 3 is brazed to the base 4.

In the modified third embodiment A3', the outer peripheral edge of the diaphragm 3 has been brazed to the diaphragm base 4. As a result, the oil 5 does not enter the gap between the two and thus the pressure applied to the sensor chip 2 never varies, but rather is uniform.

Figure 5:
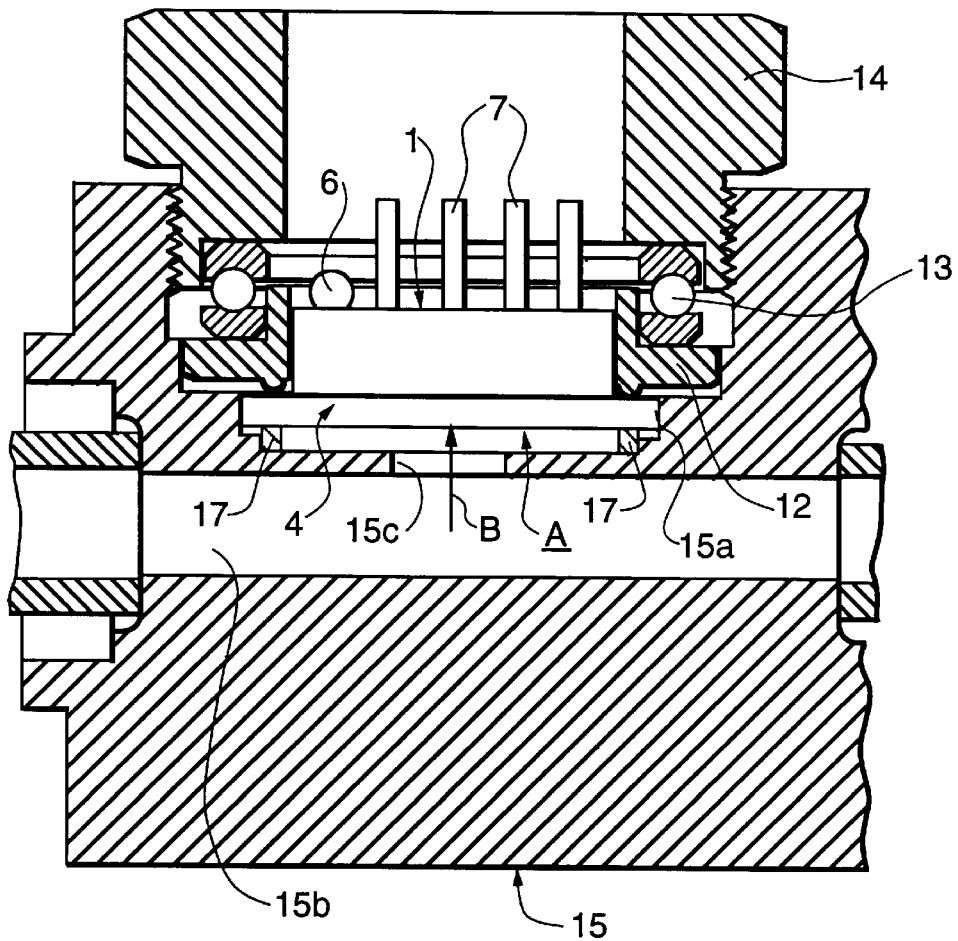
FIG. 5 is an illustrative cross-sectional view showing a pressure detector of the present invention mounted to a gas line.

FIG. 5 shows a state in which a pressure detector of this invention is connected to a gas line to detect a fluid pressure, wherein the pressure detector (A1–A3', for example) is affixedly and air-tightly secured, via a holding member 12 and a bearing 13, into a mounting hole 15a of a body 15 by screwing a fixture 14 into the body 15. Reference number 17 designates a metallic gasket whose gas-contact face is treated to form thereon a chrome-oxide passive-state film, or a fluoride passive-state film, or a mixed-oxide passive-state film mainly composed of aluminum oxide and chrome oxide.

Thus, a fluid pressure B at a flow passage hole 15b is applied through a hole 15c to the gas-contact face 3a of the diaphragm 3, and then transmitted through the silicone oil 5 (for the first and third embodiments) to the sensor chip 2.

In assembling a pressure detector using a metallic strain gauge 16, as shown in the second embodiment of FIG. 6 for example, first the passive-state film 3b is formed on the gas-contact face 3a of the diaphragm 3 provided on the diaphragm base 4; then the strain gauge 16a is fixedly secured to the inside, upper face of the diaphragm 3; and then the diaphragm base 4 and the sensor base 1 are combined with one another and secured together by the welding 8 at their side wall faces.

The steps are the same for a fourth embodiment (not depicted), where the diaphragm 3 is welded and fixed to the diaphragm base 4 and then combined with a strain gauge. That is, first the passive-state film 3b is formed on the gas-contact face 3a of the diaphragm 3; then the strain gauge 16a is fixedly secured to the inside upper face of the diaphragm 3; and finally the diaphragm base 4 and the sensor base 1 are combined and fixed to each other.

Effects of the Invention

The first and second embodiments of the invention are each constructed such that a chrome-oxide passive-state film, or a fluoride passive-state film, or a mixed-oxide passive-state film mainly composed of aluminum oxide and chrome oxide, is formed on the gas-contact face of the diaphragm provided on the diaphragm base, and then the diaphragm base and the sensor base are combined and fixed to each other.

As a result, the sensor chip which is fixed to the sensor base is never adversely affected by a high temperature while a good quality passive-state film is formed on the gas-contact face of the diaphragm; thereby allowing product quality in semiconductor manufacturing processes in which this invention is used to be further improved.

Each of the third, modified third and fourth embodiments of the invention is constructed such that the diaphragm is formed in a dish shape, with a right-angle cylindrical rim, and welded to the diaphragm base at the side wall face of the diaphragm base, and the passive-state film is formed on the gas-contact face, and then both the sensor base and the diaphragm base are welded together at the side wall face of the diaphragm base.

As a result, manufacture of the diaphragm becomes remarkably easy, and at the same time, a good quality passive-state film can be formed on the gas-contact face of the diaphragm without adversely affecting the sensor chip by a high temperature, thereby allowing product quality in semiconductor manufacturing processes to be further improved.

Further, as an embellishment, the modified third embodiment, the diaphragm base and the outer peripheral edge of the diaphragm are brazed by a brazing material, so that a variation in pressure detected values due to oil entering to a gap, and the like, become nil, thereby causing labor, for calibration of pressure detector for example, to be significantly reduced.

The present invention exhibits an excellent practical usefulness as described above.

The invention claimed is:

1. A pressure detector comprising a thin stainless steel flat plate diaphragm with a passive-state film (3b) formed on a gas-contact face (3a) thereof before welding, a diaphragm base (4) on which said diaphragm is mounted, and a separate sensor base (1) in which sensor chip (2) is housed and fixedly secured, and wherein said diaphragm base and said sensor base are combined and welded (8) to each other at side wall faces thereof, and wherein a pressure transmitting medium (5) is sealed in a gap between said sensor base (1) and said diaphragm, wherein said diaphragm (3) is formed in a shape of a dish and a passive state film (3b) selected from the group consisting of a chrome-oxide passive state film having a microcrystalline structure, a fluoride passive-state film, and a mixed-oxide passive-state film composed of aluminum oxide and chrome oxide is formed thereon wherein the diaphragm (3) with the passive-state film formed thereon and the diaphragm base (4) are secured to each other by brazing material (11), and wherein the diaphragm base (4) and the diaphragm (3) are secured to each other by welding (9).

2. The pressure detector of claim 1 wherein the diaphragm (3) has a thickness of about 50 $\mu$m.

3. A pressure detector comprising a thin stainless steel flat plate diaphragm with a passive-state film (3b) formed on a gas-contact face (3a) thereof before welding, a diaphragm base (4) on which said diaphragm is mounted, a separate sensor base (1) combined with and welded (8) to said diaphragm base at side wall faces of said sensor and diaphragm bases, and a strain gauge member (16a) fixedly secured to an inside, upper face of said diaphragm (3), wherein said diaphragm (3) is formed in a shape of a dish and a passive state film (3b) selected from the group consisting of a chrome-oxide passive state film having a microcrystalline structure, a fluoride passive-state film, and a mixed-oxide passive-state film composed of aluminum oxide and chrome oxide wherein the diaphragm (3) with the passive-state film formed thereon and the diaphragm base (4) are secured to each other by brazing material (11), and wherein the diaphragm base (4) and the diaphragm (3) are secured to each other by welding (9).

4. The pressure detector of claim 3 wherein the diaphragm (3) has a thickness of about 200 $\mu$m.

* * * * *